United States Patent
Ju (10) Patent No.: US 8,849,801 B2
(45) Date of Patent: Sep. 30, 2014

(54) SEARCH SYSTEM AND METHOD USING SEARCH LIBRARY

(75) Inventor: Eun-Sok Ju, Seongnam-si (KR)

(73) Assignee: NHN Corporation, Gyeonggi-Do (KR)

( * ) Notice: Subject to any disclaimer, the term of this patent is extended or adjusted under 35 U.S.C. 154(b) by 222 days.

(21) Appl. No.: 13/159,916

(22) Filed: Jun. 14, 2011

(65) Prior Publication Data

US 2011/0307313 A1 Dec. 15, 2011

(30) Foreign Application Priority Data

Jun. 14, 2010 (KR) ........................ 10-2010-0056002

(51) Int. Cl.
*G06F 17/30* (2006.01)
*G06F 17/00* (2006.01)
*G06F 3/00* (2006.01)
*G06Q 30/00* (2012.01)
*G06Q 30/02* (2012.01)

(52) U.S. Cl.
CPC ............ *G06Q 30/00* (2013.01); *G06Q 30/0274* (2013.01); *G06Q 30/0273* (2013.01)
USPC .......... 707/722; 707/770; 709/203; 705/14.4; 345/418; 345/619; 715/700; 715/716; 715/730

(58) Field of Classification Search
CPC ............ G06F 3/0488; G06F 17/30634; G06F 17/30929; G06Q 30/0251
USPC .......... 707/703, 722, 770; 709/203; 705/14.4; 345/418, 619, 661, 681, 156; 715/700, 715/716, 730, 744, 749, 763, 764
See application file for complete search history.

(56) References Cited

U.S. PATENT DOCUMENTS

| | | | |
|---|---|---|---|
| 6,185,733 B1 * | 2/2001 | Breslau et al. ................. | 717/163 |
| 6,738,766 B2 * | 5/2004 | Peng ...................... | 707/999.002 |
| 7,243,346 B1 * | 7/2007 | Seth et al. ..................... | 717/163 |
| 7,711,738 B1 * | 5/2010 | Kraft et al. .................... | 707/752 |
| 7,965,981 B2 * | 6/2011 | Bloebaum et al. ........... | 455/41.1 |
| 8,321,852 B2 * | 11/2012 | Shenfield ...................... | 717/162 |
| 2002/0010738 A1 * | 1/2002 | Munenaka et al. ........... | 709/203 |
| 2009/0144244 A1 * | 6/2009 | Maghoul et al. .................. | 707/3 |
| 2009/0228825 A1 * | 9/2009 | Van Os et al. ................. | 715/780 |
| 2010/0011304 A1 * | 1/2010 | Van Os ......................... | 715/762 |
| 2010/0210293 A1 * | 8/2010 | Lim et al. ...................... | 455/466 |
| 2010/0231612 A1 * | 9/2010 | Chaudhri et al. ............. | 345/684 |
| 2011/0082848 A1 * | 4/2011 | Goldentouch ................ | 707/706 |

FOREIGN PATENT DOCUMENTS

| KR | 1020090013393 | 2/2009 |
|---|---|---|
| KR | 1020090113156 | 10/2009 |

* cited by examiner

*Primary Examiner* — Cheryl Lewis
(74) *Attorney, Agent, or Firm* — Harness, Dickey & Pierce, P.L.C.

(57) ABSTRACT

Provided is a search system and method for performing a search during execution of an application in a mobile terminal. The search method may include executing an application, without terminating the application, by including a search window on a part of an execution screen of the application. The system and method also include incorporating a library into an application.

20 Claims, 6 Drawing Sheets

SEARCH SYSTEM AND METHOD USING SEARCH LIBRARY

CROSS REFERENCE TO RELATED APPLICATION

This application claims priority from and the benefit of Korean Patent Application No. 10-2010-0056002, filed on Jun. 14, 2010, which is hereby incorporated by reference for all purposes as if fully set forth herein.

BACKGROUND OF THE INVENTION

1. Field of the Invention

Exemplary embodiments of the present invention relate to a search system and method for searching a search query during execution of an application in a mobile terminal without terminating the application.

2. Discussion of the Background

Due to advancements in mobile terminal technology, various applications can be executed in a mobile terminal.

However, in some cases, an application may need to be terminated before another application is executed since mobile terminals have limited executing and processing capabilities compared to a desktop.

Accordingly, a mobile terminal user may be inconvenienced when the user desires to search for information associated with a first application, while using another application. For example, the user may need to terminate a first application, search for information (i.e., search query) by executing a search application, and then re-execute the first application after checking a search result.

Also, the user may need to perform another search associated with the first application from the search result when a large amount of information needs to be searched using the search application.

Thus, there is a need for a search system and method that may perform a search without termination of an application being executed, and that may perform a search optimized to a target that the user may desire.

SUMMARY OF THE INVENTION

Exemplary embodiments of the present invention provide a system and method for searching a search word without terminating a corresponding application, by executing the application including a search window on a part of an execution screen.

Additional features of the invention will be set forth in the description which follows, and in part will be apparent from the description, or may be learned by practice of the invention.

Exemplary embodiments of the present invention disclose a mobile terminal including an application execution unit, a display unit, and a transmission and reception unit. The application execution unit executes an application. The display unit displays an execution screen of the application and a search interface on at least a portion of the execution screen. The transmission and reception unit transmits, to a search server, information of the application and a search word input via the search interface. The transmission and reception unit receives, from the search server, a search result corresponding to the information of the application and the search word.

Exemplary embodiments of the present invention also disclose a search method.

The search method includes executing an application, displaying a search interface on a part of an execution screen of the application, transmitting, to a search server, a search word input in the search interface and information of the application, receiving, from the search server, a search result corresponding to the search word and the information of the application, and displaying the received search result.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Exemplary embodiments of the invention are described more fully hereinafter with reference to the accompanying drawings. The invention may, however, be embodied in many different forms and should not be construed as limited to the exemplary embodiments set forth herein. Rather, the exemplary embodiments are provided so that this disclosure is thorough and complete, and will convey the scope of the invention to those skilled in the art. In the drawings, the size and relative sizes of layers and regions may be exaggerated for clarity. Like reference numerals in the drawings denote like elements.

The terminology used herein is for the purpose of describing exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. A search method according to exemplary embodiments of the present invention may be performed by a search system.

Figure 1:
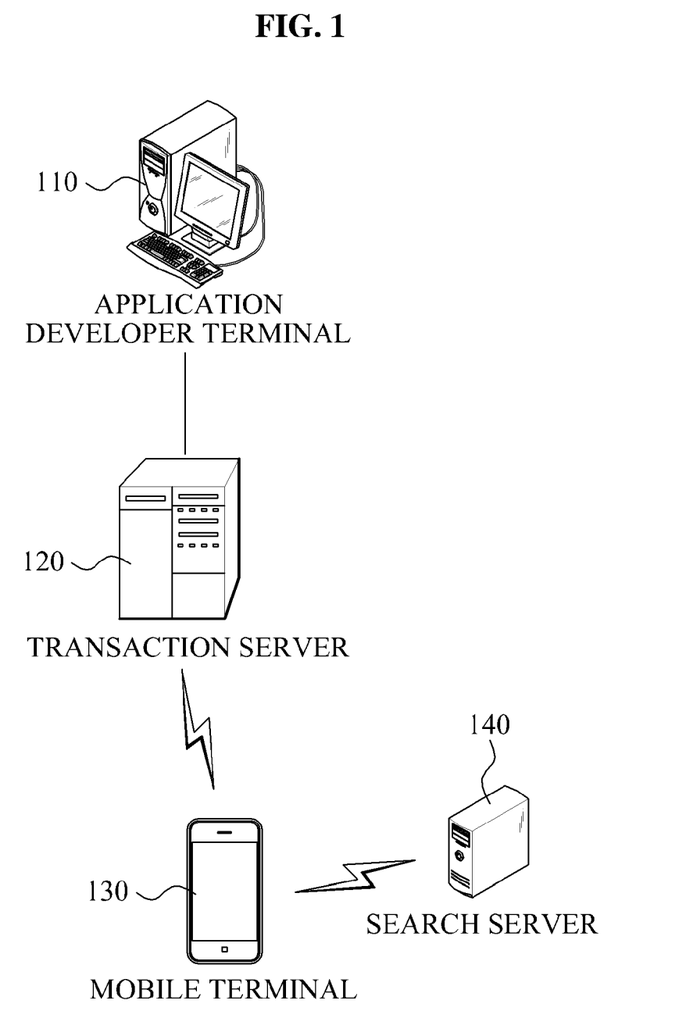
FIG. 1 is a diagram illustrating a configuration of a search system according to exemplary embodiments of the present invention.

FIG. 1 is a diagram illustrating a configuration of a search system according to exemplary embodiments of the present invention.

A search system may search for a search word that a user may want to search, without terminating an application while using the application in a mobile terminal, in part, by displaying a search interface on an application screen using a search library inserted into the application.

Referring to FIG. 1, the search system may include an application developer terminal 110, a transaction server 120, a mobile terminal 130, and a search server 140.

An application that may be used in the mobile terminal 130 may correspond to an application that incorporates a search library. The application may have been developed, coded, and edited by a developer using an application developer terminal 110. A configuration and operation of the application developer terminal 110 will be further described with reference to FIG. 4.

The search library may correspond to a library that may embed the search interface in the application.

Also, the developer may set, in the search library, a search interface, such as, a search word input window, to be displayed on an execution screen of the application.

Particularly, when the search library is incorporated into the application, the search interface may be displayed on the execution screen of the application at a position of the search interface set by the developer in the search library.

The mobile terminal 130 may correspond to a terminal that may execute at least one application by downloading the at least one application among applications that the developer may upload to a transaction server 120. The mobile terminal 130 may be any suitable mobile electronic device including, but not limited to, a smart phone, a navigation device, and an electronic pad.

The mobile terminal 130 may further display the search interface of the search library in the execution screen of the application, when the application is executed.

When a search word(s) is input in the search interface, the mobile terminal 130 may transmit, to the search server 140, search information including the search word(s), request the search server 140 to perform a search, receive a search result associated with the search request from the search server 140, and provide the user with the search result received from the search server 140.

The search information may include at least one of identification information of the application into which the search library may be incorporated, the search word, and information with respect to the user using the mobile terminal 130. Identification information of an application may include, for example, a version number of the application, a name of the application, and the developer of the application.

The user information may correspond to information that may be provided from the application in which the search library is incorporated, and may include information with respect to at least one of gender, age, residence, and a region where the mobile terminal 130 is located.

When search information is received from the mobile terminal 130, the search server 140 may search for information corresponding to the search information, and may transmit, to the mobile terminal 130, a search result corresponding to the search information.

The search server 140 may store the user information and the search word or the search result that is received, as statistical information. In some cases, the search server 140 may store, as statistical information, the user information and the search word or the search result that is received with respect to each application into which the search library is incorporated. When the search word is received, the search server 140 may perform a search based on the statistical information, thereby providing the user with an optimal search result.

A configuration and operation of the search server 140 will be further described with reference to FIG. 5.

Figure 2:
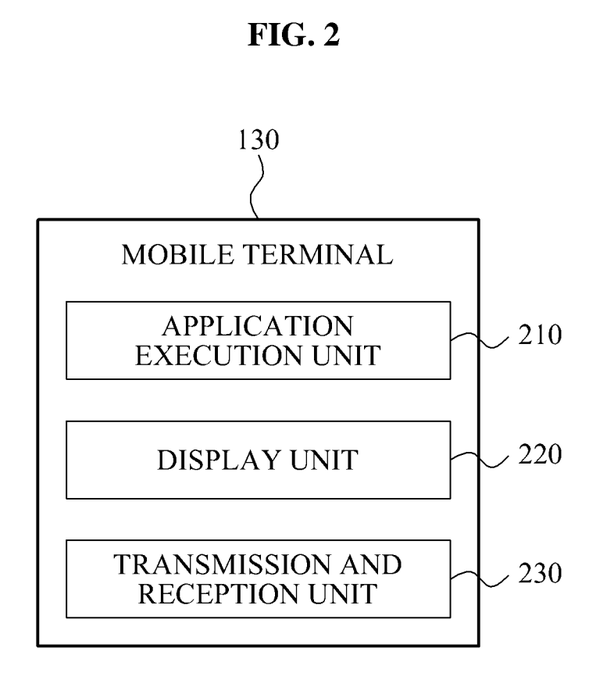
FIG. 2 is a block diagram illustrating a configuration of a mobile terminal according to exemplary embodiments of the present invention.

FIG. 2 is a diagram illustrating a configuration of the mobile terminal 130 according to exemplary embodiments of the present invention.

Referring to FIG. 2, the mobile terminal 130 may include an application execution unit 210, a display unit 220, and a transmission and reception unit 230. It should be understood that the mobile terminal 130 is not limited to the components noted above, and may include various other components. For example, the mobile terminal 130 may also include a processor and a memory (not shown).

The application execution unit 210 may execute an application into which the search library is incorporated.

The display unit 220 may display an execution screen of an application being executed by the application execution unit 210, and may display a search interface according to the search library in at least a part of the execution screen.

The display unit 220 may display a search result with respect to the search word input in the search interface, by receiving the search result from the transmission and reception unit 230.

The transmission and reception unit 230 may transmit, to the search server 140, the search word input in the search interface displayed by the display unit 220, and may transmit, to the display unit 220, the search result in response to receiving the search result from the search server 140.

When a search word is input, the application execution unit 210 may generate search information based on the input search word, and may transmit the search information to the transmission and reception unit 230.

The transmission and reception unit 230 may then transmit, to the search server 140, the search information received from the application execution unit 210, using a function included in the search library.

Figure 3:
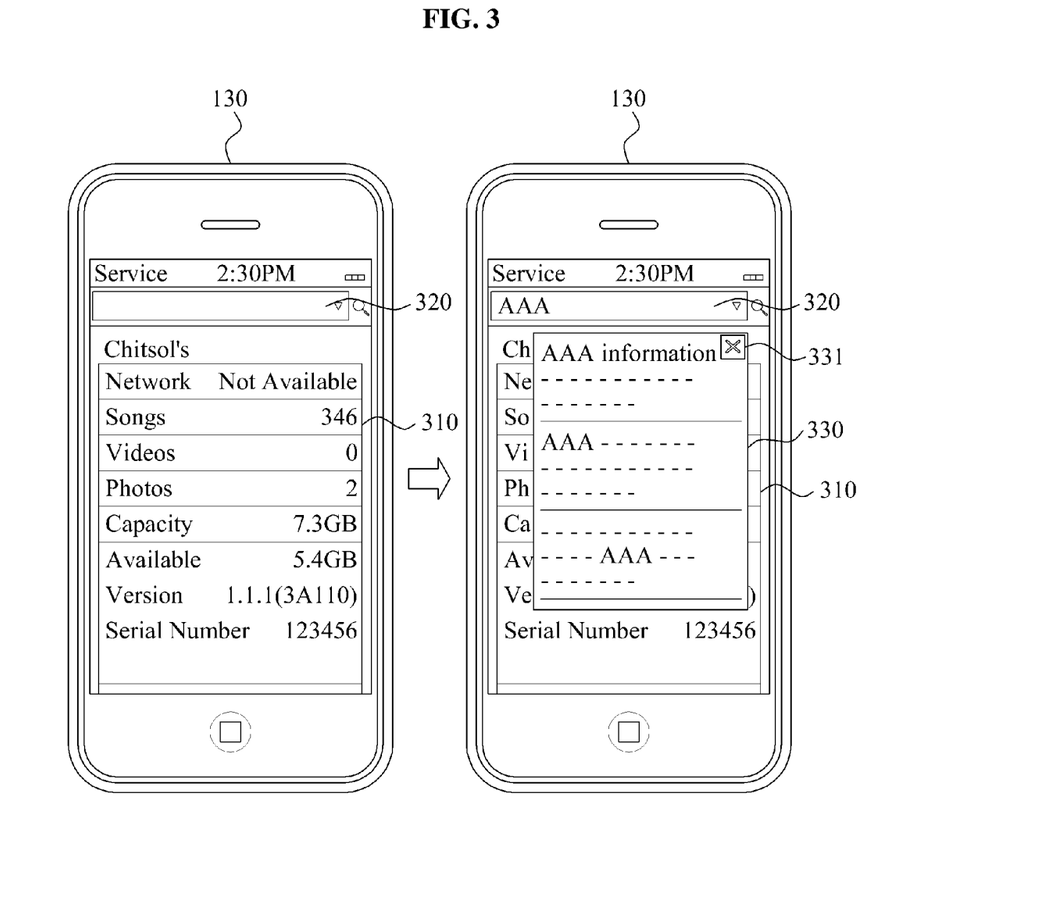
FIG. 3 is a diagram illustrating an example of an operation of an application displayed in a mobile terminal according to exemplary embodiments of the present invention.

FIG. 3 is a diagram illustrating an example of an operation of an application displayed in the mobile terminal 130 according to exemplary embodiments of the present invention.

As illustrated in FIG. 3, the mobile terminal 130 may display a search interface 320 according to a search library in an execution screen 310 of an application.

When a user desires to search for information while using the application, the information may be searched without terminating the application by inputting, in the search interface 320, a search word(s) corresponding to the information to be searched.

The mobile terminal 130 may then transmit, to the search server 140, the search information including the search word input in the search interface 320, and, in response, may receive, from the search server 140, the search result based on the search information. After receiving the search result, the mobile terminal 130 may display the search result using a search result window 330. The search result window 330 may be of any size and shape and may be displayed in any portion of the display unit 220.

In some cases, the search result window 330 may be displayed by superimposing the search result window 330 on the execution screen 310 of the application. For example, as shown in FIG. 3, the mobile terminal 130 may display the search result window 330 using a sub-window superimposed on the execution screen 310 of the application. The mobile terminal 130 may display an end icon 331, on a part of the search result window 330. When the user desires to close the search result, the mobile terminal 130 may terminate display of the search result window 330 in response to selection of the end icon 331, thereby providing the user with the execution screen 310 of the application that may have been displayed before performing the search.

In some cases, the mobile terminal 130 may display the search result window 330 by replacing the execution screen 310 of the application with the search result window 330. For example, after entering the search word(s) in the search interface 320, the mobile terminal 130 may display the search result window 330 only. Upon receiving a return request entered by the user by selecting a return icon, the mobile terminal 130 may return to displaying only the execution screen 310 of the application. The mobile terminal 130 may display the search result window 330 including a return icon, and may display the execution screen 310 of the application by replacing the search result window 330 with the execution screen 310 of the application when the return icon is selected.

In some cases, the search result window 330 and the execution screen 310 may be displayed as separate windows being simultaneously displayed by the display unit 220. The search result window 330 may be displayed after receiving the search word input via the search interface 320, and a size of the execution screen 310 may be adjusted so that the search result window 330 and the execution screen 310 may be displayed simultaneously. When the search result window 330 and the execution screen 310 are displayed simultaneously, the search result window 330 and the execution screen 310 may be displayed in a horizontal configuration (e.g., the search result window 330 is displayed horizontally next to the execution screen 310) or in a vertical configuration (e.g., the search result window 330 is displayed above or below the execution screen 310). In general, the search result window 330 and the execution screen 310 may be displayed in any suitable configuration. The search result window 330 may also include a return icon. If the return icon is selected, the search result window 330 may no longer be displayed, and the size of the execution screen 310 may then be adjusted again.

Figure 4:
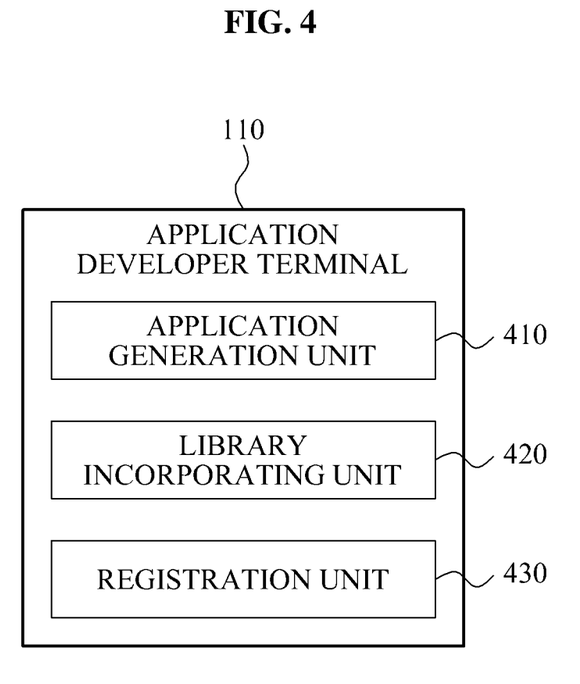
FIG. 4 is a block diagram illustrating a configuration of an application developer terminal according to exemplary embodiments of the present invention.

FIG. 4 is a block diagram illustrating a configuration of the application developer terminal 110 according to exemplary embodiments of the present invention.

The application developer terminal 110 may include an application generation unit 410, a library incorporating unit 420, and a registration unit 430. It should be understood that the application developer terminal 110 is not limited to the components noted above, and may include various other components.

The application generation unit 410 may generate an application that may be executed in the mobile terminal 130 based on an input of a user and/or an application developer.

The library incorporating unit 420 may incorporate, into the application, a search library that may enable performing a search during execution of the application generated by the application generation unit 410. The search interface 320 of an application may be embedded in the search library of the application. The search library may set a position in which the search interface 320 is displayed on the execution screen 310 of the application.

Consequently, a search interface 320 may be displayed on an execution window of the application generated by the application generation unit 410.

The registration unit 430 may register, to the transaction server 120, the application into which the search library is incorporated by the library incorporating unit 420, so that the user may purchase the application having an incorporated search library, and may download the purchased application to the mobile terminal 130.

Figure 5:
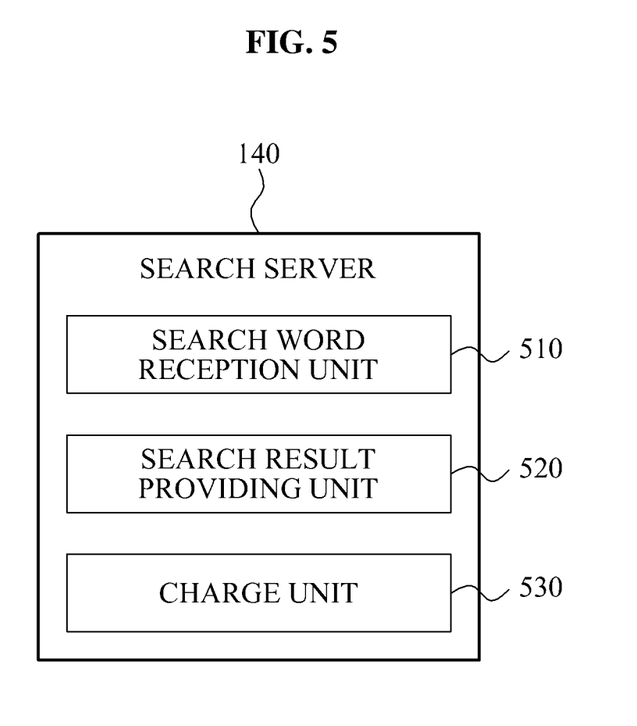
FIG. 5 is a block diagram illustrating a configuration of a search server according to exemplary embodiments of the present invention.

FIG. 5 is a block diagram illustrating a configuration of the search server 140 according to exemplary embodiments of the present invention.

The search server 140 may include a search word reception unit 510, a search result providing unit 520, and a charge unit 530. It should be understood that the application developer terminal 110 is not limited to the components noted above, and may include various other components. The search server 140 may be connected to another server, computing device, and/or network, such as the internet or a service providing network (e.g., telephone service providing network/server, cable/internet service, and broadcasting service). In some cases, the search server 140 may also be connected to an advertisement database that provides the search server 140 with advertisements related to an input search word(s).

The search word reception unit 510 may receive search information from the mobile terminal 130, and may provide the received search information to the search result providing unit 520.

The search information received by the search word reception unit 510 may include at least one of identification information of the application in which the search library is incorporated, the search word received using the search interface 320 embedded in the application, and information with respect to the user of the mobile terminal 130.

The search result providing unit 520 may provide, to the mobile terminal 130, the search result corresponding to the search information received by the search word reception unit 510. In some cases, the search result providing unit 520 may also provide, to the mobile terminal 130, search advertisements associated with the input search word(s) along with the search results. The search results and/or search advertisements may be obtained by communicating with external networks and devices such as the internet or an advertisement database.

For example, when the application into which the search library is incorporated corresponds to an application for reading a book (e.g., an e-book) and the user inputs a search word(s) found in the e-book via the search interface 320, the search result providing unit 520 may provide, to the mobile terminal 130, titles of books and/or content corresponding to the search word, as the search result.

As another example, when the application into which the search library is incorporated corresponds to an application associated with a game, and the user inputs a search word(s) associated with the game via the search interface 320, the search result providing unit 520 may provide, to the mobile terminal 130, a name of a game corresponding to the search word, or an article and information associated with the game, as the search result.

The charge unit 530 may charge an advertiser of an advertisement based on exposure of the advertisement(s) displayed along with the search result provided by the search result providing unit 520.

The charge unit 530 may provide a developer having provided the application, with a portion of the revenue generated by charging the advertiser. In some cases, the search server 140 may be connected to the transaction server 120, and the charge unit 530 may provide the developer of the application with a portion of the revenue through the transaction server 120.

In some cases, the search server 140 may also include or be connected to a user profile database (not shown). The user profile database can store various types of information including, for example, a history of searches made by a user, frequent searches by a user, and frequently-provided search results to a user. The user profile database may arrange the stored information by an identity of a user or the mobile terminal 130.

Figure 6:
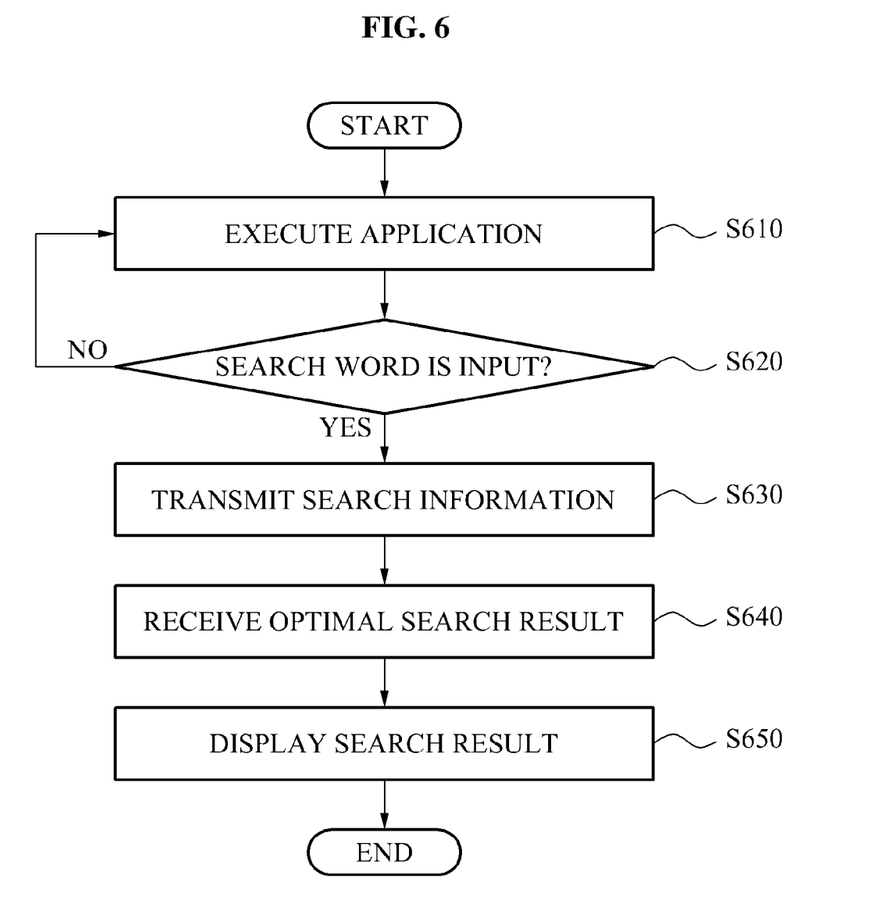
FIG. 6 is a flowchart illustrating a search method according to exemplary embodiments of the present invention.

FIG. 6 is a flowchart illustrating a search method according to exemplary embodiments of the present invention.

In operation S610, the application execution unit 210 may execute an application selected by a user.

When the application selected by the user corresponds to an application into which a search library may be incorporated, the display unit 220 may display an execution screen 310 of the selected application, and may display a search interface 320 according to the search library in the execution screen 310.

In operation S620, the application execution unit 210 may determine whether a search word is input in the search interface 320.

When the search word has not been input in the search interface 320 and another input has been made by the user, the application execution unit 210 may perform a process related to the other input and control the application based on the other input by executing operation S610. The display unit 220 may display an execution screen 310 in response to performing the process related to the other input, any may continue to display the search interface 320.

When a search word is input in operation S620, the application execution unit 210 may transmit, to the search server 140, search information including the search word input using the transmission and reception unit 230 in operation S630.

The information generated by the application execution unit 210 may include at least one of identification information of the application in which the search library is incorporated, the search word, and information with respect to the user of the mobile terminal 130.

The transmission and reception unit 230 may transmit, to the search server 140, the search information received from the application execution unit 210, using a function included in the search library.

In operation S640, the transmission and reception unit 230 may receive, from the search server 140, an optimal search result based on the search information transmitted in operation S630. The transmission and reception unit 230 may also receive, from the search server 140, advertisements corresponding to the input search word.

For example, when the application selected in operation S610 corresponds to an e-book, the transmission and reception unit 230 may receive, from the search server 140, titles of books or contents corresponding to the search word, as the search result.

In some cases, the transmission and reception unit 230 may receive, from the search server 140, the search result optimized based on a search history of the user of the mobile terminal 130. For example, when the user of the mobile terminal 130 has searched for a book having a particular author or a book of a particular genre several times, the search server 140 may transmit, to the mobile terminal 130, a search result including a book having the particular author, or a book having the particular genre from books corresponding to the search word received in operation S630, based on statistical information of the search result.

In operation S650, the display unit 220 may display the search result received in operation S640.

For example, the display unit 220 may display a search result window 330 including the search result, on the execution screen 310 of the application displayed in operation S610, using a sub-window. In some cases, the search result window 330 may also display advertisements related to the search word(s).

In some cases, the display unit 220 may display the search result window 330 by replacing the execution screen 310 of the application displayed in operation S610 with the search result window 330.

According to exemplary embodiments of the present invention, it is possible to search a search word that a user may desire, without terminating a corresponding application while using the corresponding application in a mobile terminal, by executing an application in which a search interface may be embedded.

It is also possible for a developer to incorporate an advertising library into an application that the developer may have developed, by charging an advertiser of an advertisement, based on exposure of the advertisement corresponding to a search result, and by providing the developer having provided the application, with a portion of revenue generated by charging the advertiser.

Although exemplary embodiments of the present invention have been shown and described above, it should be understood that exemplary embodiments of the present invention are not limited to the described embodiments. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
an application execution unit configured to execute an application;
a display unit configured to display, on an execution screen of the application, a search interface on at least a portion of the execution screen, the search interface being embedded according to a search library that is inserted into the application, the search interface being accessible while the application is running; and
a transmission and reception unit configured to,
transmit, to a search server, search information, the search information including at least two of (i) a search word input via the search interface, (ii) identification information associated with the application into which the search library is embedded, and (iii) user information associated with the mobile terminal, and
receive, from the search server, a search result corresponding to the search information,
wherein the display unit is configured to display the search result without terminating the application.

2. The mobile terminal of claim 1, wherein:
the search library is configured to set a position where the search interface is displayed on the execution screen of the application.

3. The mobile terminal of claim 1, wherein the display unit is configured to display, on the execution screen of the application, a search result window to display the search result.

4. The mobile terminal of claim 1, wherein the display unit is configured to display the execution screen of the application in response to input of a return request while the search result is being displayed.

5. The mobile terminal of claim 1, wherein the transmission and reception unit is configured to receive, from the search server, an optimized search result based on the search information.

6. An application developer terminal, comprising:
a processor including an application generation unit configured to generate an application that is executed in a mobile terminal;
the processor including a registration unit configured to register and transmit the application to a server; and
the processor including a library incorporating unit configured to embed, into the application, a search library to enable performance of a search during execution of the application, the search library inserting a search interface into the application, the search interface being accessible while the application is running, and the search interface returning a search result without terminating the application,
the search interface being used to transmit search information, the search information including at least two of (i) a search word input via the search interface, (ii) identification information associated with the application into which the search library is embedded, and (iii) user information associated with the mobile terminal.

7. The application developer terminal of claim 6, wherein the search library is configured to provide the search interface to be displayed in an execution window of the application.

8. A search server, comprising:
a search word reception unit configured to receive search information of an application having an embedded search interface from a mobile terminal configured to execute the application, the search interface being embedded according to a search library that is inserted into the application, the search interface being accessible while the application is running, the search information including at least two of (i) a search word input via the search interface, (ii) identification information associated with the application into which the search library is embedded, and (iii) user information associated with the mobile terminal; and
a search result providing unit configured to provide, to the mobile terminal, a search result corresponding to the received search information, the search result being provided without terminating the application, and the search information is configured to be received using the search interface.

9. The search server of claim 8, further comprising:
a charge unit configured to charge an advertiser of an advertisement displayed with the search results based on exposure of the advertisement.

10. The search server of claim 9, wherein the charge unit is configured to provide a developer of the application with a portion of revenue generated by charging the advertiser.

11. A method for executing a search on a search server, the method comprising:
executing an application;
displaying a search interface on a part of an execution screen of the application, the search interface being embedded according to a search library that is inserted into the application, the search interface being accessible while the application is running;
transmitting, to the search server, search information, the search information including at least two of (i) a search word input via the search interface, (ii) identification information associated with the application into which the search library is embedded, and (iii) user information associated with the mobile terminal;
receiving, from the search server, a search result corresponding to the search information; and
displaying the received search result without terminating the application.

12. The search method of claim 11, wherein:
the search library is configured to set a position where the search interface is displayed on the execution screen of the application.

13. The search method of claim 11, wherein displaying the received search result comprises displaying, on the execution screen of the application, a search result window to display the search result.

14. The search method of claim 11, wherein displaying the received search result comprises displaying the execution screen of the application in response to input of a return request while the search result is displayed.

15. The search method of claim 11, wherein the receiving comprises:
receiving, from the search server, the search result comprising an optimized search result based on the search information.

16. A method of generating an application executed on a mobile terminal, the method comprising:
generating an application to be executed in a mobile terminal; and
embedding a search library in the application, the search library enabling a search to be performed during execution of the application, the search library inserting a search interface into the application, the search interface being accessible while the application is running, and the search interface returning a search result without terminating the application,
the search interface being used to transmit search information, the search information including at least two of (i) a search word input via the search interface, (ii) identification information associated with the application into which the search library is embedded, and (iii) user information associated with the mobile terminal.

17. The method of claim 16, further comprising setting, via the search library, a display position of a search interface of the application in an execution window of the application.

18. A method for executing a search on a search server, the method comprising:
receiving search information from a mobile terminal configured to execute the application having an embedded search interface, the search interface being embedded according to a search library that is inserted into the application, the search interface being accessible while the application is running; and
providing, to the mobile terminal, a search result corresponding to the received search information,
wherein the search word is configured to be received using the embedded search interface, and the search information includes at least two of (i) a search word input via the search interface, (ii) identification information associated with the application into which the search library is embedded, and (iii) user information associated with the mobile terminal.

19. The search method of claim 18, further comprising:
providing an advertisement along with the search result; and
charging an advertiser of the advertisement based on exposure of the advertisement.

20. The search method of claim 19, further comprising:
providing a developer of the application with a portion of revenue generated by charging the advertiser.

* * * * *